United States Patent [19]

Copeland et al.

[11] Patent Number: 5,734,689
[45] Date of Patent: Mar. 31, 1998

[54] THERMAL NEUTRON DETECTOR

[75] Inventors: Hugh D. Copeland, Chula Vista; Jon R. Losee; Gary F. Mastny, both of San Diego, all of Calif.

[73] Assignee: The United States of America as represented by the Secretary of the Navy, Washington, D.C.

[21] Appl. No.: 592,905

[22] Filed: Jan. 29, 1996

[51] Int. Cl.$^6$ .................................................. G01T 3/00
[52] U.S. Cl. ................. 376/153; 250/390.01; 250/390.11
[58] Field of Search ............................. 376/153–155, 376/254, 255; 250/370.01, 370.02, 370.04–370.06, 372, 390.01, 370.09, 392, 390.11

[56] References Cited

U.S. PATENT DOCUMENTS

| | | | |
|---|---|---|---|
| 4,118,626 | 10/1978 | Goldstein et al. | 250/370 |
| 4,425,907 | 1/1984 | Younghouse. | |
| 4,429,228 | 1/1984 | Anderson. | |
| 4,454,422 | 6/1984 | Persyk. | |
| 4,799,748 | 1/1989 | Brown. | |
| 4,804,514 | 2/1989 | Bartko et al. | |
| 4,814,623 | 3/1989 | Robertson et al. | |
| 5,180,917 | 1/1993 | Wraight. | |
| 5,489,781 | 2/1996 | Mohr | 250/385.1 |
| 5,519,226 | 5/1996 | Copeland et al. | 250/390.11 |

OTHER PUBLICATIONS

Derzon et al., "A High–Pressure $^3$HE Gas Scintillation Neutron Spectrometer", *IEEE Transactions on Nuclear Science*, vol. 33, No. 1, Feb. 1986, pp. 247–249.

*Primary Examiner*—Harvey E. Behrend
*Attorney, Agent, or Firm*—Harvey Fendelman; Michael A. Kagan; Eric James Whitesell

[57] ABSTRACT

A thermal neutron detector comprises an enclosure containing a helium–xenon gas mixture, an optical fiber, and an electrode arranged to detect ion particles. The optical fiber detects photons generated by a reaction of the gas mixture with neutrons passing through the enclosure. The reaction also generates ion particles that are detected by the electrode. A coincidence detector generates an output signal corresponding to the correlation of ion detections from the electrode with photon detections from the optical fiber, rejecting signals generated from the electric field that are not correlated with photon detections.

11 Claims, 3 Drawing Sheets

THERMAL NEUTRON DETECTOR

CROSS-REFERENCE TO RELATED APPLICATIONS

This application is related to the thermal neutron detector described by Copeland, et al U.S. Pat. No. 5,519,226 issued on May 21, 1996 titled "DETECTION OF THERMAL NEUTRONS THROUGH THE USE OF INTERNAL WAVELENGTH SHIFTING OPTICAL FIBERS".

BACKGROUND OF THE INVENTION

The present invention relates to thermal neutron detectors. More specifically, but without limitation thereto, the present invention relates to detection of thermal neutron capture by correlating electrical and optical events coincident with the capture of a thermal neutron in a helium gas mixture.

A currently used type of detector of thermal neutrons indirectly senses the capture of a thermal neutron by a $^3$He nucleus in an electric field. Most of these detectors incorporate charge sensitive preamplifiers to sense the ions collected in an electrically polarized, gas filled chamber. The electrical charge is believed to be created by fission of the helium nucleus into electrically charged ion particles.

A disadvantage of this method is that in an ion chamber, electrical charges that are mechanically induced via the capacitance of the ion chamber components generate signals of the same order of magnitude as the ion particle charge resulting from thermal neutron capture. This noise is often referred to as microphonic noise.

A need therefore exists for a thermal neutron detector that discriminates against microphonic noise to more accurately measure thermal neutron radiation.

SUMMARY OF THE INVENTION

The thermal neutron detector of the present invention is directed to overcoming the problems described above, and may provide further related advantages. The embodiment of the thermal neutron detector in the following description does not preclude other embodiments and advantages of the present invention that may exist or become obvious to those skilled in the art.

A thermal neutron detector comprises an enclosure containing a helium-xenon gas mixture, an optical fiber, and an electrode arranged to detect ion particles. The optical fiber detects photons generated by a reaction of the gas mixture with neutrons passing through the enclosure. The reaction also generates ion particles that are detected by the electrode. A coincidence detector generates an output signal corresponding to the correlation of ion detections from the electrode with photon detections from the optical fiber, rejecting signals generated from the electric field that are not correlated with photon detections.

An advantage of the thermal neutron detector is that electrical signals not associated with thermal neutron radiation are excluded from the measurements.

Another advantage is that microphonic noise need not be estimated to correct measurements of thermal neutron radiation.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

Figure 1:
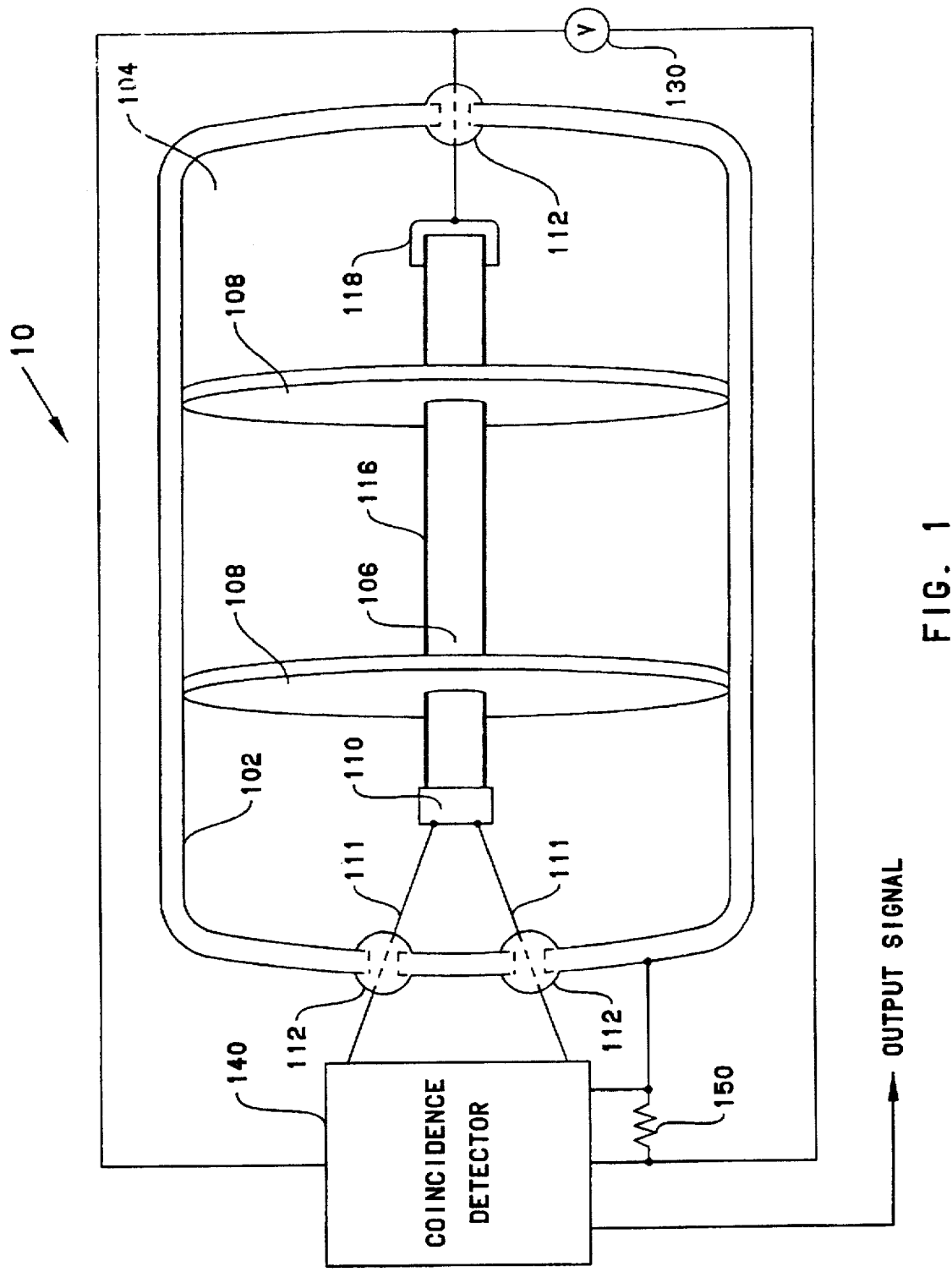
FIG. 1 illustrates a cross section of a thermal neutron detector of the present invention with a single optical fiber having an ultraviolet-transparent, electrically conductive coating.

In FIG. 1, a thermal neutron detector 10 comprises a conductive cylinder 102. Conductive cylinder 102 encloses a volume of a helium-xenon gas mixture 104 and an optical fiber 106. Optical fiber 106 is supported in cylinder 102 by electrically nonconductive spacers 108. A photodetector 110, such as a SiAPD or PIN photodiode, may be coupled to optical fiber 106 to convert light emerging from optical fiber 106 into electrical signals. Optical fiber 106 is preferably made of an ultraviolet-absorbing material to convert ultraviolet photons to photons of a longer wavelength that may be readily detected by photodetector 110. By way of example, an Optectron F2011000 wavelength shifting optical fiber may be used for optical fiber 106.

Electrical connections 111 to photodetector 110 are conducted outside cylinder 102 via feedthroughs 112. Optical fiber 106 may be coated with an ultraviolet-transparent, conductive coating 116 for generating an electric field within conductive cylinder 102. For example, semitransparent photocathode bialkali or multialkali material may be used for conductive coating 116. Electrical signals from conductive coating 116 are electrically coupled to a termination 118. Termination 118 couples the electrical signals through conductive cylinder 102 via a feedthrough 112. Optical fiber 106 may be supported inside conductive cylinder 102 by electrically non-conductive spacers 108. A voltage source 130 may be connected to conductive cylinder 102 and termination 118 to generate an electric field (not shown) between conductive coating 116 and conductive cylinder 102. A current detector 150 may be connected in series with voltage source 130 and conductive cylinder 102 to sense ion current as an alternative to sensing ion charge on conductive coating 116.

In operation, helium-xenon gas mixture 104 reacts with thermal neutrons passing through cylinder 102 to generate ultraviolet photons and ion particles (not shown). The ultraviolet photons absorbed by optical fiber 106 are converted to an appropriate wavelength and directed along optical fiber 106 to photodetector 110. Photodetector 110 transforms the incident photons to an electrical signal. Concurrently, the ion particles follow the electric field generated from voltage source 130 connected between conductive coating 116 and conductive cylinder 102. The ion particles attracted to conductive coating 116 deposit a charge on conductive coating 116, or may cause an electric current to flow through current detector 150.

Alternatively, an electric field may be generated between spacers 108 by incorporating a conductive material in a portion of spacers 108. Other electrode configurations may readily be arranged inside conductive enclosure 102 to generate an electric field for collecting ion particles.

A coincidence detector 140 may be connected to photodetector 110, conductive coating 116, and current detector 150 to correlate the detection of ultraviolet photons by photodetector 110 with the detection of ion current by current detector 150 or ion particle charge on conductive coating 116. The optical and electrical phenomena of thermal neutron capture are correlated to discriminate against non-correlated electrical signals from current detector 150 or conductive coating 116 generated by the electric field from sources such as microphonic noise. Coincidence detector 140 may be made according to well known techniques, for example, by a gate circuit that gates the signals from current detector 150 using the pulses from photodetector 110 to control the gate. The gated signal may then be output in digital or analog format for display or monitoring by an external device (not shown).

Figure 2:
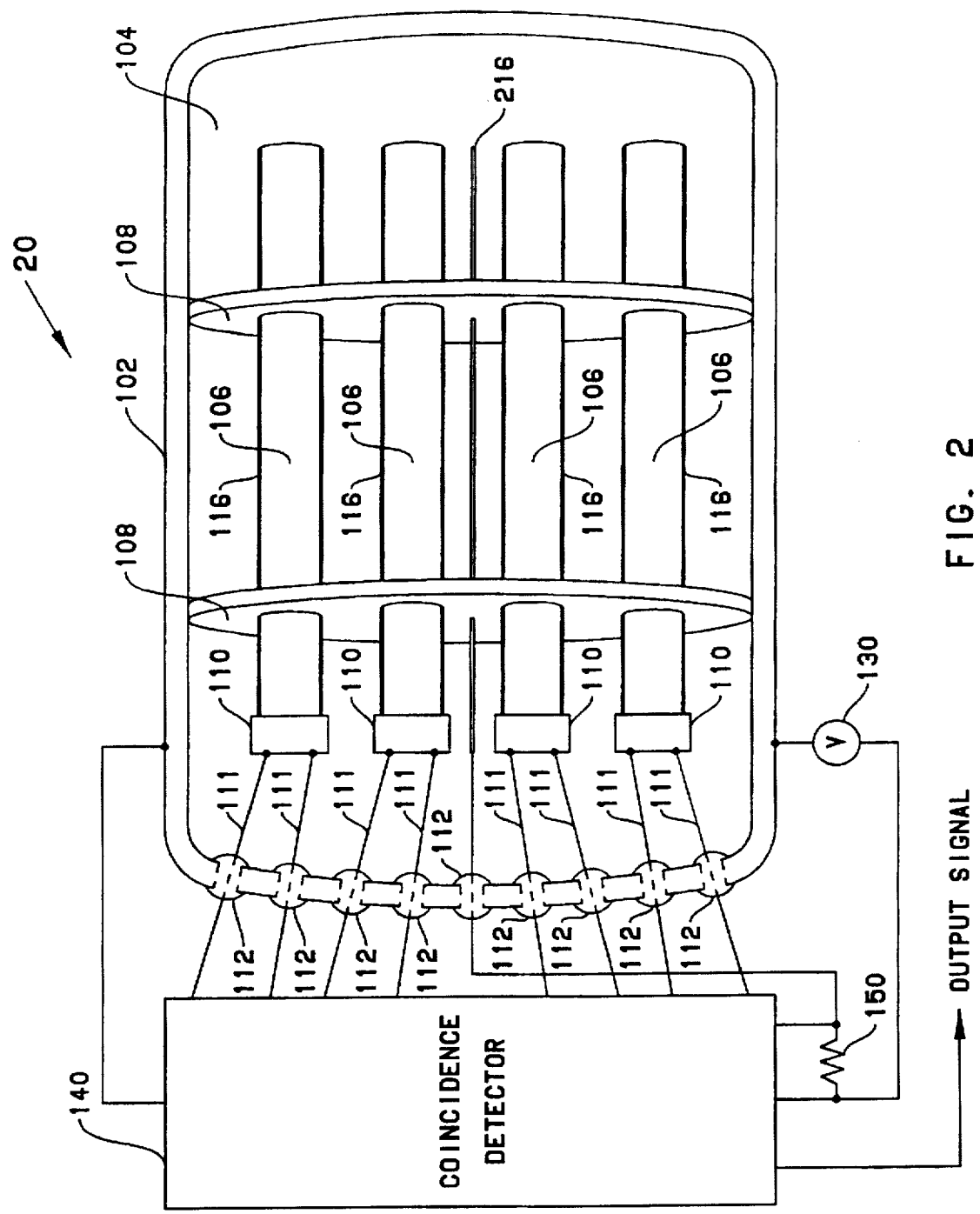
FIG. 2 illustrates a cross section of a thermal neutron detector of the present invention with multiple optical fibers and a wire electrode.

FIG. 2 is a cross-section of a thermal neutron detector 20 that incorporates multiple optical fibers 106 and photodetectors 110 distributed inside conductive cylinder 102. Elements in FIG. 2 that are substantially identical in structure and function to those described above for FIG. 1 are similarly numbered for reference. The function of generating an electric field referenced to conductive cylinder 102 may alternatively be performed in thermal neutron detector 20 by a conductive wire 216 instead of conductive coating 116 as in FIG. 1.

Figure 3:
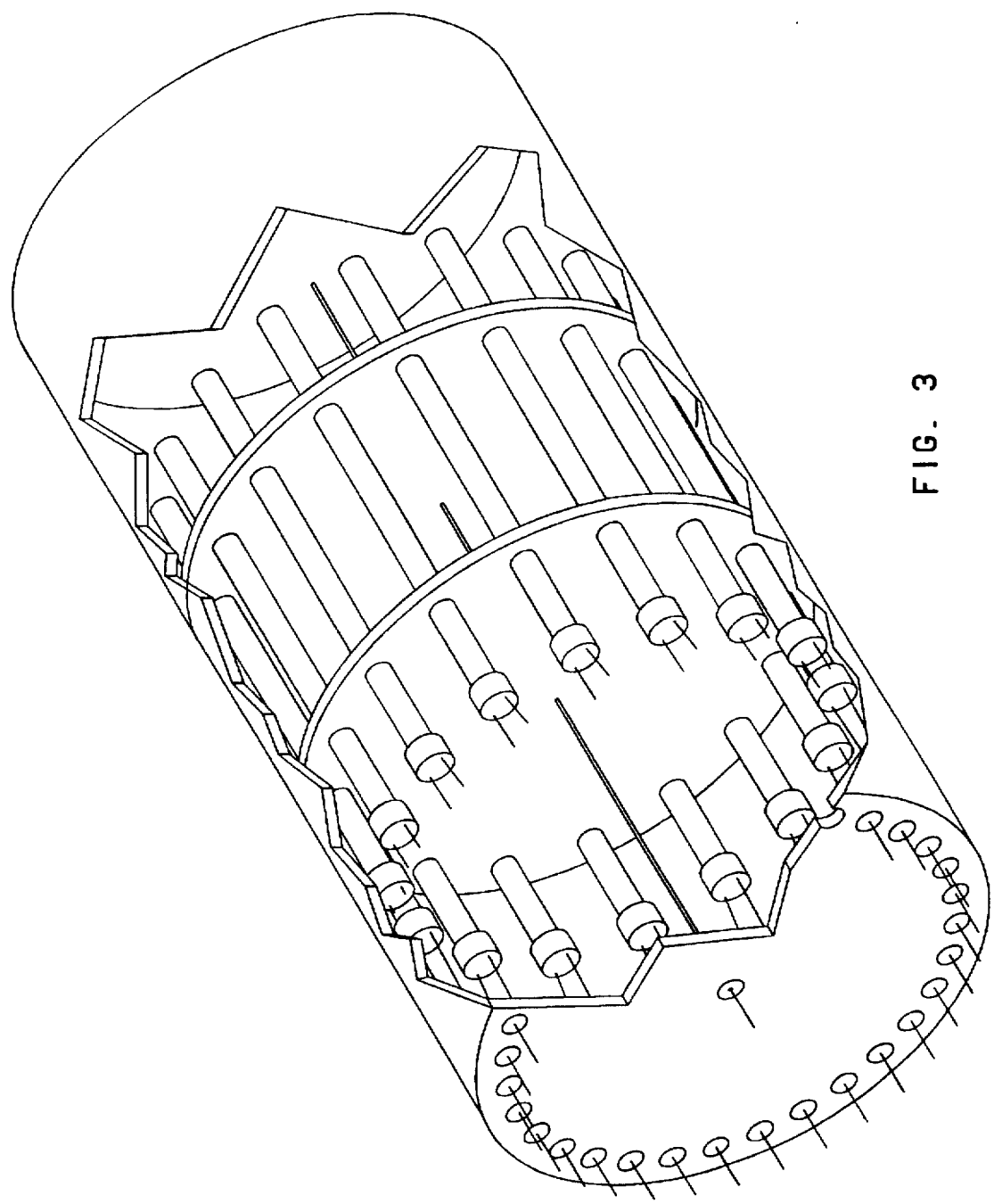
FIG. 3 is a perspective view of the neutron detector illustrated in FIG. 2.

FIG. 3 is a perspective view of the neutron detector illustrated in FIG. 2.

The operation of thermal neutron detector 20 is similar to that described for thermal neutron detector 10 in FIG. 1.

Other modifications, variations, and applications of the present invention may be made in accordance with the above teachings other than as specifically described to practice the invention within the scope of the following claims.

We claim:

1. A thermal neutron detector comprising:

an enclosure;

a gaseous mixture contained within said enclosure;

an optical fiber coupled to an within said enclosure for generating an optical detection signal in response to photons generated by a reaction of said gaseous mixture with neutrons passing through said enclosure;

an electrical signal detector coupled to said gaseous mixture for generating an electrical signal in response to ion particles generated by said reaction; and a coincidence detector for receiving said optical detector signal and said electrical signal for correlating said optical detector signal with said electrical signal.

2. The thermal neutron detector of claim 1, further comprising a photodetector coupled to said optical fiber for generating said optical detection signal.

3. The thermal neutron detector of claim 1, further comprising a voltage source operably coupled to said electrical signal detector for generating an electric field to direct said ion particles to said electrode.

4. The thermal neutron detector of claim 1, wherein said electrical signal detector comprises an electrically conductive coating on said optical fiber, wherein said coating is substantially transparent to said incident photons.

5. The thermal neutron detector of claim 1, wherein said electrical signal detector comprises at least one of an electrically conductive wire, an electrically conductive tube, and said enclosure.

6. The thermal neutron detector of claim 1, wherein said gaseous mixture comprises helium and xenon.

7. The thermal neutron detector of claim 1, further comprising insulating feedthroughs operably coupled to said enclosure for making electrical connections through said enclosure.

8. The thermal neutron detector of claim 2, further comprising a coincidence detector operably coupled to said electrical signal detector and said photodetector.

9. The thermal neutron detector of claim 1, further comprising a current detector operably coupled to said electrical signal detector.

10. The thermal neutron detector of claim 1, further comprising a spacer for supporting at least one of said optical fiber and said electrical signal detector within said enclosure.

11. The thermal neutron detector of claim 1, wherein said electrical signal detector comprises said spacer.

* * * * *